(12) United States Patent
Grogoza

(10) Patent No.: US 7,117,659 B1
(45) Date of Patent: Oct. 10, 2006

(54) HIGH VISIBILITY ARTICLE WITH SAFETY RELEASE LINK

(75) Inventor: Marijan Grogoza, Mansfield, OH (US)

(73) Assignee: Animal Safety Products, Inc., Mansfield, OH (US)

( * ) Notice: Subject to any disclaimer, the term of this patent is extended or adjusted under 35 U.S.C. 154(b) by 0 days.

(21) Appl. No.: 10/949,920

(22) Filed: Sep. 25, 2004

Related U.S. Application Data

(63) Continuation-in-part of application No. 10/821,363, filed on Apr. 9, 2004, which is a continuation-in-part of application No. 10/456,447, filed on Jun. 6, 2003, now Pat. No. 6,786,028, which is a continuation-in-part of application No. 10/223,737, filed on Aug. 20, 2002, now Pat. No. 6,574,948, which is a continuation-in-part of application No. 09/967,687, filed on Oct. 1, 2001, now abandoned.

(51) Int. Cl.
*A62B 35/00* (2006.01)
*B68G 11/00* (2006.01)

(52) U.S. Cl. ........................ 54/79.4; 119/865

(58) Field of Classification Search ................ 54/79.4; 119/772, 792, 865, 858, 856; D2/627; 24/312, 24/314, 319, 358, 380, 182, 714.6, 174, 573.11, 24/578.15, 162
See application file for complete search history.

(56) References Cited

U.S. PATENT DOCUMENTS

| | | | |
|---|---|---|---|
| 3,011,478 A | 12/1961 | Kirby | |
| 3,605,384 A | 9/1971 | Pacini | |
| 4,384,548 A * | 5/1983 | Cohn | 119/858 |
| D373,011 S * | 8/1996 | Rippel | D2/627 |
| 5,575,044 A * | 11/1996 | Zornes | 24/182 |
| 5,658,313 A * | 8/1997 | Thal | 24/358 |
| D385,043 S * | 10/1997 | Worthington | D2/972 |
| 5,785,011 A * | 7/1998 | Gitterman, III | 119/865 |
| 5,791,297 A | 8/1998 | Mudge | |
| 6,098,384 A | 8/2000 | Porrello | |
| 6,230,663 B1 * | 5/2001 | Welch et al. | 119/772 |
| 6,360,404 B1 | 3/2002 | Mudge et al. | |
| 6,499,437 B1 * | 12/2002 | Sorensen et al. | 119/792 |
| D472,499 S * | 4/2003 | Valle | D2/627 |
| D473,034 S * | 4/2003 | Styne | D2/627 |
| D474,423 S * | 5/2003 | James | D11/231 |
| D492,107 S * | 6/2004 | Brown | D30/152 |
| 2005/0145203 A1* | 7/2005 | Wang | 119/865 |

* cited by examiner

*Primary Examiner*—Teri Pham Luu
*Assistant Examiner*—Elizabeth Shaw
(74) *Attorney, Agent, or Firm*—F. T. Morelle

(57) ABSTRACT

A safety ensemble with inherent, highly visible radiance/luminosity and a releasable link to allow the animal to shed the ensemble if it becomes dangerously snagged. The ensemble takes the form of bridle, collar, halter or harness, for draping/encircling a portion of an animal's body, and includes at least one strap member, the opening or separation of which allows the animal to break free of the ensemble. The safety link is realized in disengaging-resetting elements, as well as frangible/breakable-replaceable types. Inherent high visibility is acquired through use of highly luminous, reflective or radiant materials in or placed on selective elements of any article of the invention.

7 Claims, 3 Drawing Sheets

HIGH VISIBILITY ARTICLE WITH SAFETY RELEASE LINK

CROSS-REFERENCES TO RELATED APPLICATIONS

This application is a Continuation-in-Part of U.S. patent application Ser. No. 10/821,363, filed on Apr. 9, 2004, by the same inventor, entitled: Illuminative and Reflective Safety Horse Garment, which is a Continuation-in-Part of U.S. application Ser. No. 10/456,447, filed Jun. 6, 2003, now U.S. Pat. No. 6,786,028, which is a Continuation-in-Part of U.S. application Ser. No. 10/223,737, filed on Aug. 20, 2002, now U.S. Pat. No. 6,574,948, which is a Continuation-in-Part of U.S. application Ser. No. 09/967,687, filed on Oct. 1, 2001 (now abandoned) and for which priority is claimed under 35 USC 119(e) and 120.

STATEMENT REGARDING FEDERALLY SPONSORED RESEARCH OR DEVELOPMENT

Not Applicable

BACKGROUND OF THE INVENTION

1. Field of the Invention

This invention relates generally to animal equipment including collars, halters, harnesses and the like. More specifically, it is drawn to an article of such that acquires an extraordinary degree of safety owing to a novel combination of the item's normal functionality with a high visibility character and an emergency/safety release feature. Release is effected upon an event that either breaks, or causes to be opened, a safety link that is part of any such equipment. The invention is also applicable to human articles of safety such as belts and back packs.

2. Discussion of Relevant Art

Several disclosures are considered as relevant to the instant invention. These show, in general, means for endowing articles, that consist of straps, belts or chains, with a rapid release capability, should the animal fitted with such an article (as the binding member of a collar, halter or harness) become captured in brush, fencing or some other projection in an undesired entanglement. Relative to this discussion, U.S. Pat. No. 3,994,265 ('265) issued to Banks discloses a breakaway device made for a cat's collar. The safety link of '265 includes a socket type keeper at one end of the collar that is receptive of a ball device fitted to the other end of the collar. The socket captures the ball, which has pins extending there from, into its cavity and presents it for a restrictive extraction when a tug of sufficient force is applied to the collar. This device is the paradigm for one class of non-breakable quick-release links. Although incorporating the concept of flea/tick prevention, the Banks collar bore no other incidents that would expand its safety function.

Another U.S. Pat. No. 5,791,297 ('297), was issued to Mudge for a dog collar that included a safety release in order to prevent the animal from strangling. The separation/release member is, like the Banks ('265), one which relies upon the resilient character of interlinked halves or complements. Though re-useable, the Mudge collar, in that it is an ordinary collar, enjoys no greater functionality than its emergency release ability.

Mudge et al., in U.S. Pat. No. 6,360,404 ('404) show something similar to '297, in the manner of breakaway safety releases. This is an article that is designed for large animals, as well as dogs. It can function in a belt, strap or halter (see FIGS. 9–12). The connection means is the breakaway device itself (such as in the instant invention) and operates when a force or tug is applied to the appliance sufficient to pull a lug through a restrictive set of jaws. The operative characteristic lies in the flexibility or resilience of the lug-capturing jaws.

A disclosure by Porrello, U.S. Pat. No. 6,098,384, shows what appears to be a belt apparatus that combines adjustment means with a frangible link in the form of a conventional buckle's tongue. As with frangible links/connectors, this one requires replacement of the breaking link, an operation not discussed within the disclosure, but perhaps self evident. As another type of release, being neither frangible but resilient, U.S. Pat. No. 3,605,384 ('384), issued to Pacini, employs a releasable link or binder constructed of opposable strips which feature resilient, engaging hook members on one (strip) and loops on the other. This particular binding device is marketed under the trade name VELCRO®, and is used worldwide. The hook and loop device is excellent for strapping or binding, however the instant inventor, although making use of it as an optional release in her invention, was dissatisfied in the realization that, depending on the care with which the VELCRO® member is engaged, no firm standard of force could be determined that would effect consistent release or breakaway events.

An excellent example of a resilient safety release is that shown in a U.S. patent issued to Kirby, U.S. Pat. No. 3,011,478 ('478). Comprising the safety release for a choke collar, the device consists of a steel ring, a ring, of predetermined diameter, affixed to one end of the collar, captive of a spring biased, V-shaped element affixed to the other end. When a tug of calculable force is applied to the collar, the element is forcibly drawn through the ring, releasing the ring and V element linkage. Compressing the spring allows for the element's insertion into the ring, thereby reestablishing the link and foregoing the necessity of equipment repair or change-out. The only limitation perceived in this release device is, because of an elemental extension beyond the ring periphery, a possibility exists during pasturage that a branch or other projection may wedge between the extension and the ring, or the biasing spring, thus altering the critical release characteristics of the device. Like the preceding disclosures, '478 shows little or no other functional attributes characteristic of the apparatus in which the safety release is used.

U.S. Pat. No. 6,786,028 ('028), recently issued to Longtin is a priority document for this application and teaches, inter alia, animal coverings and associated articles of highly illuminative character. While employing VELCRO® ties, such are not specifically taught as releasable safety links, although certainly capable and effective therefor.

INCORPORATION BY REFERENCE

The utility of the various devices employed for the safety release of various bindings placed on animals, e.g., collars, halters, reins, and other buckle/strap-on accouterments, is evidenced by the multiplicity of such for which patents have been issued. For their showing of these devices, the following U.S. patents are hereby incorporated by reference: U.S. Pat. Nos. 3,011,478; 3,994,265; 5,791,297; 6,098,384; 6,360,404 and 6,786,028.

DEFINITIONS

Most terminology used herein lends itself to the common lexicon. To establish the inventor's particular meanings, specifically for collective or generic words or phrases, the reader is referred to the following, in bold print:

anvil—a ring device or a stylized characterization of the rigid frame of the common buckle, whether it is associated with the tongue;

continuity—having the nature of being continuous or unbroken (Note:continuity acquired by use of links or connections is termed herein as piece-wise continuity);

frame—having the structure of a picture frame in various geometrical shapes;

frangible—applied here in its broadest sense, i.e., breakable;

keeper—a stylized designation for the frame-anvil part if this invention that serves to hold or constrain a rod-like element;

integral (integrated)—a unit or whole (of being whole or complete for purpose);

link—a connector or connection of any type that ensures (piece-wise) continuity in a leash, cord, cable, strap or similar binding, tethering or body part-embracing articles; and separable—capable of separation by fracture, breakage or fundamental design.

BRIEF SUMMARY OF THE INVENTION

Safety release devices, or links as they shall be referred to hereinafter, are common in animal husbandry as in the field of automatic machinery. Their use is to provide various degrees of safety when no supervision is present. Thus, the animal restraint art is replete with such devices, but lacking in the combination with high visibility indicia such as luminescent, iridescent, reflective or radiant markings or physical composition. The instant inventor has provided, therefore, the combination of a safety release with high visibility character for a host of animal embracement articles including belts, bridles, collars, halters, harnesses, etc.

The safety release link is provided in a frangible/breakable option, as well as a spring-biased, pull-apart or pop-out one. The former consists of a cord, breakable rod/dowel, cord or zip-tie, the latter of a restrained, resiliently bendable rod. The pull-apart release is realized using the multiple, opposing hook-loop device trademarked as VELCRO.®

The high visibility, illuminative character is provided either intrinsically through the use of iridescent/reflective/luminescent materials or dyes (the inventor recommends international/blaze orange) or a lighted portion attached to the most visible portions of the article. The latter is likely to be used only in a temporary circumstance when the animal is allowed to roam only for short periods, in subdued light.

For the most part, this high visibility article, with its safety release, takes the form of collars or harnesses for animals that are turned out to pasture (horses, goats, cows, etc.) or allowed to roam and are likely to become entangled in brush, fences and similar snags.

DETAILED DESCRIPTION OF THE INVENTION

Allowing an ensnared or entangled animal to free itself from brush, fences, posts and the like has been the objective of many inventors. Thus, the functionality of break away devices has commanded much attention in the design of collars, harnesses, halters, etc., especially with regard to unattended animals, irrespective of size. The instant inventor has long engaged in the creation of high visibility gear for animals ranging from the small domestics to much larger farm and sporting animals. Indeed, the art taught hereinafter is applicable to human equipment/apparel that requires the safety functions of high visibility and immediate, safe release.

Figure 1:
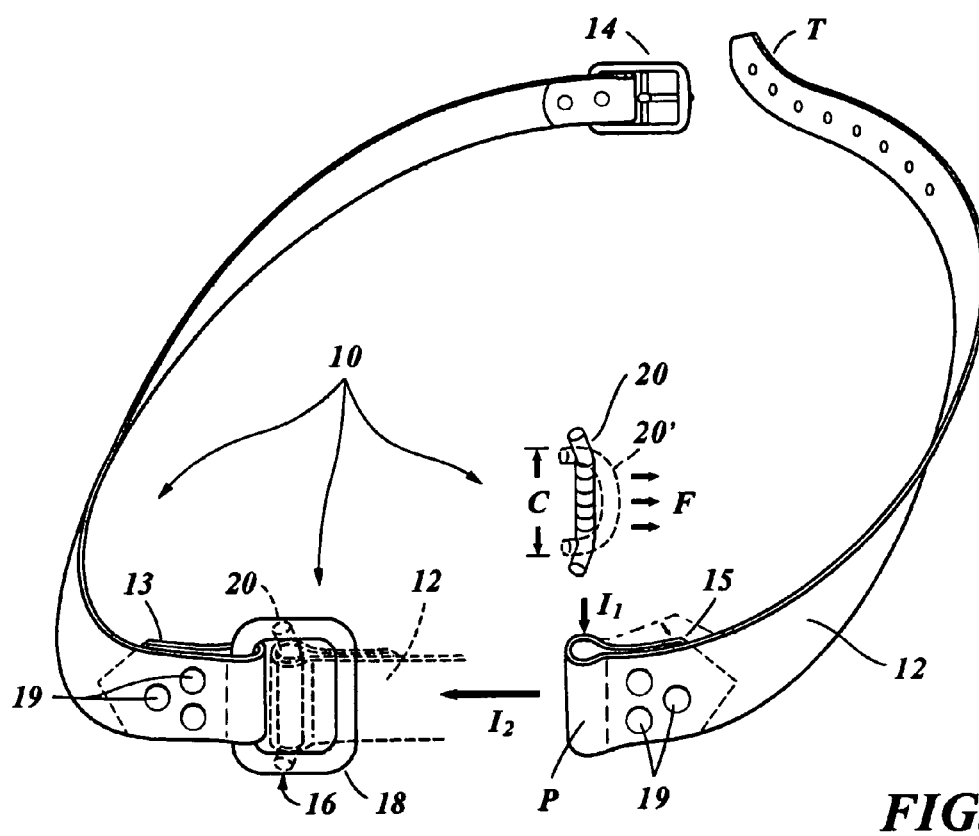
FIG. 1 is an illustration of the invention showing a collar article having a deformable/bendable safety link.

Referring now to FIG. 1, there is depicted the invention 10 adapted to a belt/strap 12, or collar, that is made of a strong material, such as a solid or woven man-made or natural substance. The instant inventor recommends a modern polymer that has been infused with the highly luminescent dyes that afford the article of the invention the utmost visibility. Where deemed practicable, the manufacturer may elect to use natural substances such as leather or tightly woven natural fibers. Any are suitable so long as the article can, for the most part, be rendered highly reflective, luminescent or otherwise radiant. The collar is, in this particular mode, fitted with a buckle assembly 14. It can be readily surmised that such an article is useful, not merely as a collar, but as a belt or any portion of a halter or harness, its function being to act as a girdling and securing element.

Complementing the high visibility strap 12 of the invention is the releasable/separable link 16, consisting of a constraining frame-anvil device, alternatively termed a "keeper" 18, and a resilient, bendable rod 20, which may be straight or slightly curved at its ends (arcuate). The ends and/or preponderance of the rod may also be flattened (not shown), depending on a manufacturer's preferences. The rod is spring-like (deformable), and when subjected to a predetermined force F, must be capable of flexing/bending (20') to the shown length C, so as to pass through the keeper 18. As identified in DEFINITIONS, the keeper is realized essentially as a ring or frame, not unlike the frame portion of a common buckle. One end of the belt/strap 13 is turned about a long margin of the frame and secured to itself by a suitable means, here rivets 19. The complimentary end 15 is retroflexed and secured in similar fashion about the deformable rod 20, or alternatively, to form a pocket P. In the former case, the tongue end T of the strap 12 must be fed through the keeper 18 to seat the rod, as shown at the left, in phantom. In the latter case, the buckle assembly 14 is not altogether required, because the (empty) pocket P can be used as a buckle by first passing ($I_2$) it through the keeper 18, the rod 20 then being pressed ($I_1$) into the pocket, to complete the assembly 16. Once the article is placed on the creature, the illuminative aspect will afford warning of its presence to passersby; while, the breakaway feature of the releasable link 16 will function to disengage the belt ends 13/15, should the predetermined force F be applied to the article and transmitted to the rod 20.

Figure 2:
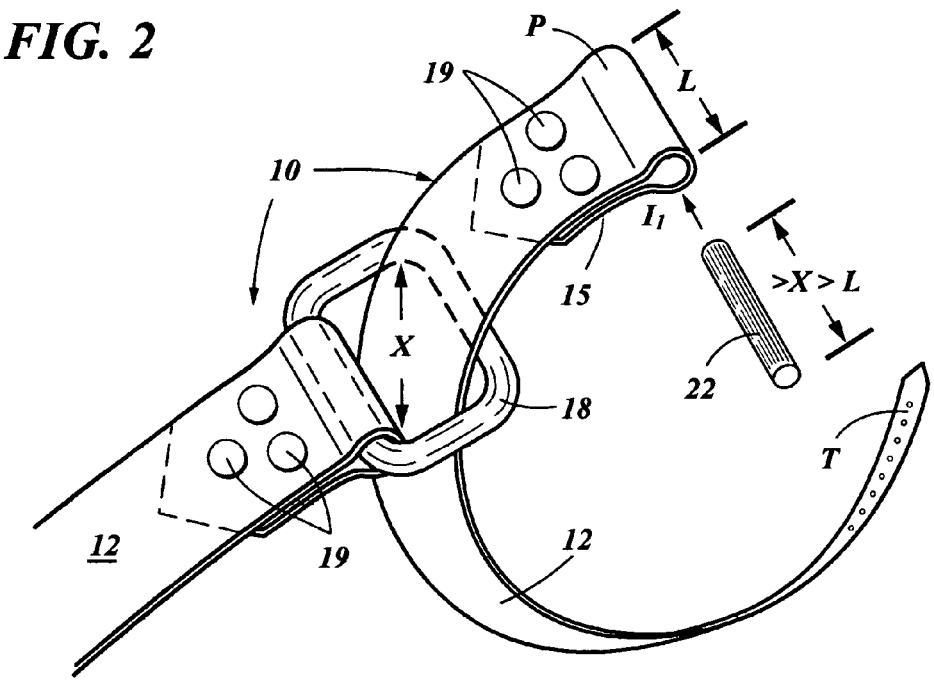
FIG. 2 is an illustration of the invention showing the collar article of FIG. 1, in part, and having a frangible safety link.

Similar in most respects to the FIG. 1 embodiment, that of FIG. 2 differs significantly in the use of a frangible rod 22. Here, the breakable or frangible rod or dowel is composed of a material such as wood, fiber, plastic or even a brittle metal. It should have a known fracture modulus, in respect of the so-equipped creature's size and strength. A buckle frame or suitable keeper 18, as in the FIG. 1 article, is either of the form shown or simply a geometrically shaped constraining element, such as a ring. In any case, its diametrical or diagonal length X must be less than the length of the rod 22. As for the rod, its length, greater (>) than X, must also be greater than L, where L is the length of the pouch P which is formed by retro-flexing and making fast 19 the ends of the belt 12. For rapid engagement of the article 10, it is only necessary to pressingly insert (I$_1$) the rod 22 into the pouch P so that its ends extend equally beyond the pouch, such as shown in FIG. 1 at rod 20. The tongue T end of the belt 12 is then passed through the keeper 18 and secured to the buckle (not shown). As an alternative, the buckle (14 of FIG. 1) need not be used with this embodiment because the empty pouch may be passed in through the keeper (after the article 10 is donned) and the rod 22 then inserted. When the article is a simple collar, or more complex but not intended for frequent removal, any adaptation capable of engagement without a buckle 14 (as in FIGS. 2–4, and seen with the halter article of FIG. 5) qualifies as best mode.

Figure 3:
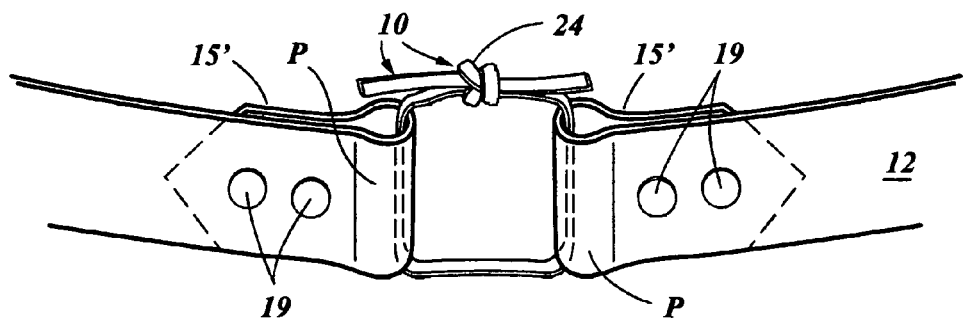
FIG. 3 is an illustration of the invention showing a breakable safety link device installed in a strap.
Figure 4:
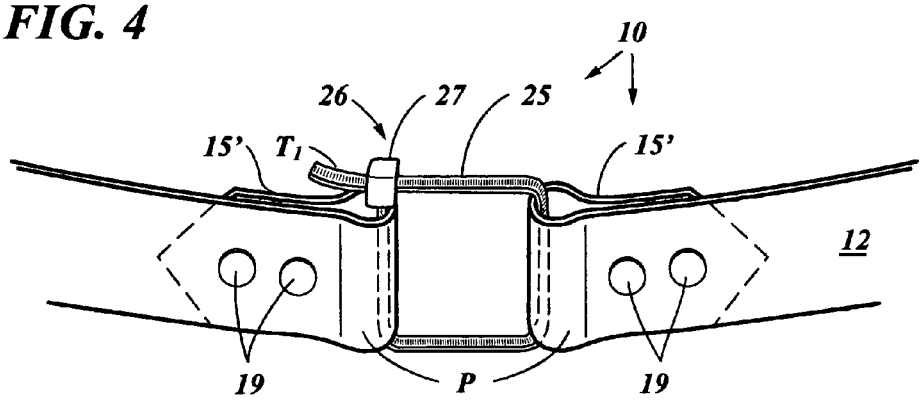
FIG. 4 is a replication of FIG. 3, but for the showing of an alternate form of the breakable safety link.

The embodiment of the invention 10 that is the most expedient to realize is depicted in FIGS. 3 and 4. The buckle 14 is not shown in these figures simply because, in its most simplistic form, whether collar, halter or harness of any type, the true functionality of the invention lies in its high visibility combined with at least one safety release or separable "breakaway" feature. Thus in these two figures, only a high visibility belt/strap 12 with retroflexed ends 15', secured with suitable means 19 to create end pockets P, are shown. Of special and significant interest in FIGS. 3 and 4, respectively, are the breakaway elements of this embodiment: a knotted length of leather 24 and a polymeric zip-tie 26. Referring to FIG. 3, the cord 24, though here made of leather, may be of any material, for which the breaking point might be calibrated or otherwise ascertained. It (the cord) must be capable of being hand-knotted and not subject to wide tensile strength when wet. It can be a polymeric plastic, so long as it can be (non-slip) knotted in situ, for field application.

Combining the above physical qualities is the alternate expression of the non-slip-knotted tie, the zip-tie 26 of FIG. 4. This zip-tie element of the invention 10 consists in an integral anchor member 27 from which a transversely corrugated, elongated strip 25 depends. The anchor is hollow, with an interior one-way restriction, in order to receive there through the tongue T$_1$ of the strip and, thereafter resist its retrograde slippage from the anchor. The breaking point for the zip-tie element can be predicated on either breakage of the strip 25 or the breakaway of, or from, the anchor.

Figure 5:
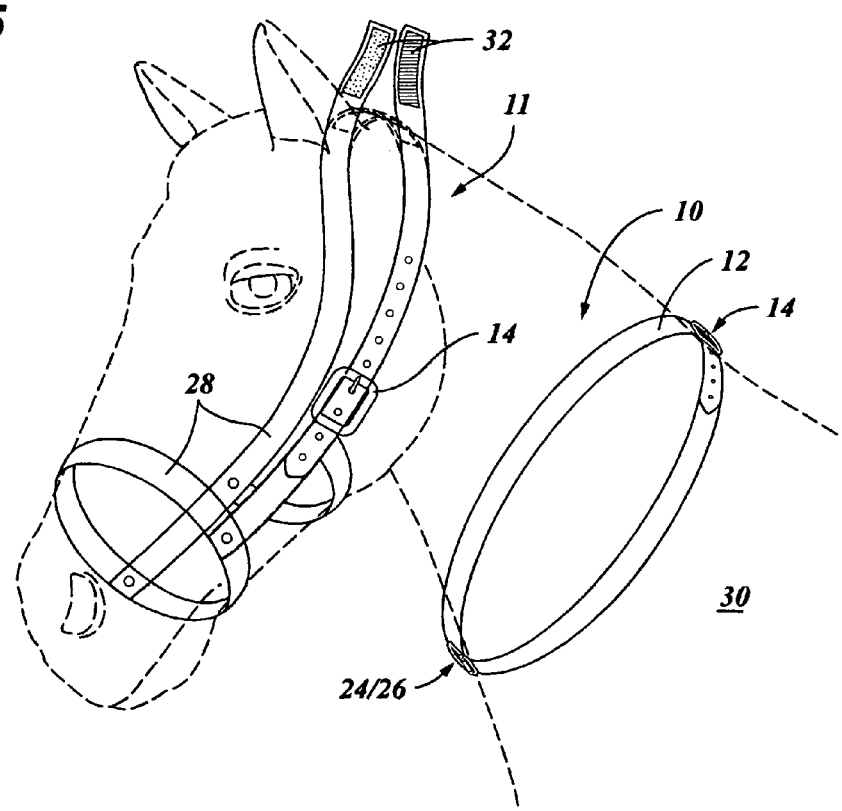
FIG. 5 is a drawing of a horse equipped with collar and halter articles of the invention.

Finally, there is depicted in FIG. 5 a phantom image of a horse 30 outfitted with the collar 10 and halter 11 articles of the invention. The collar 10 consists in the strap 12 member with the tie 24/26 breakaway devices. The halter 11 consists in a buckle 14 (not required here), the various straps 28 and the VELCRO® attachment/breakaway element 32. The invention now having been disclosed in sufficient detail, it is commended to the field consistent with the hereafter appended claims.

What is claimed is:

1. A safety ensemble featuring a unitary assembly of strap members selected from the class of articles consisting of belts, bridles, collars harnesses and halters, said ensemble configured for releasable encirclement of a portion of a creature's body and characterized by an inherent, highly visible radiance/luminosity and at least one strap member having at least piece-wise continuity, the at least one strap member featuring two strap ends, with each of said two strap ends held in releasable engagement with the other by a link apparatus, said link apparatus featuring a connector selected from the class of bindings consisting of rawhide leather cords or plastic zip ties, whereby a tug of predetermined force on the ensemble effects a disengagement of said ends at the link apparatus, releasing the ensemble from said encirclement.

2. An animal identification and breakaway safety assembly comprising:
   an article for fixation about a portion of the animal's body, the article possessing an intrinsic highly visible, radiant/luminous character; and
   a strap means for effecting and maintaining said fixation, the strap means being inherently separable at an interior point thereof, the interior point characterizing a break in continuity of the strap mans and held in piece-wise continuity at said point solely by an integral, releasable link mechanism comprising two opposing ends at said break in the strap means which are joined by the releasable link, the releasable link further comprising a 360 degree frame of defined inner diametrical/diagonal span disposed at one of said two ends, and a spring means comprising a rod medially disposed at the other of said two ends and essentially defining two arms having a tip-to-tip spacing substantially wider than said defined inner diametrical/diagonal span of the frame, whereupon compression/bending of the spring means forces said tip-to-tip spacing to less than the defined inner diametrical/diagonal span thereby allowing said spring means to pass through the frame and effect disengagement of said fixation.

3. The assembly of claim 2 further comprising a unitary strap article that is one selected from the class of articles consisting of belts, bridles, collars, harnesses and halters.

4. The assembly of claim 2 further comprising one or more strap adjustment members selected from the class consisting of buckles, clasps and interlinking hook-loop apparata.

5. A safety article for placement on an animal, that provides visible identification of the animal and release therefrom in the event of article snagging/entanglement, comprising:
   strap means including at least one belt member for securing said placement on a portion of said animal, said strap means further having an inherent high visibility character, the at least one belt member featuring a first end and a second end with said first end and said second end being closely disposed and conformable for a mutual linking; and
   a connection means for providing said mutual linking, the connection means further comprising an empty frame of defined inner diametrical/diagonal span disposed at the first of said two ends; and a frangible member disposed at the second of said two ends and essentially defining two arms having a tip-to-tip spacing configured for a predetermined fracture modulus, whereupon a force applied on the member, and exceeding the fracture modulus, causes a breakage of at least one of said arms rendering said connection means releasable.

6. The article of claim 5 wherein said inherent high visibility character is effected by usage of one or more devices selected from the class of visibly radiant media consisting of luminescent materials, illuminative fibers/LEDs, and reflectors.

7. The article of claim 6 wherein said strap means is selected from the class of articles consisting of belts, bridles, collars, harnesses and halters.

\* \* \* \* \*